(12) United States Patent
Eriksson

(10) Patent No.: US 9,618,103 B2
(45) Date of Patent: Apr. 11, 2017

(54) SCREW ACTUATED PRESS UNIT

(71) Applicant: ATLAS COPCO INDUSTRIAL TECHNIQUE AB, Stockholm (SE)

(72) Inventor: Kjell Thomas Martin Eriksson, Stockholm (SE)

(73) Assignee: ATLAS COPCO INDUSTRIAL TECHNIQUE AB, Stockholm (SE)

( * ) Notice: Subject to any disclaimer, the term of this patent is extended or adjusted under 35 U.S.C. 154(b) by 124 days.

(21) Appl. No.: 14/349,321

(22) PCT Filed: Sep. 24, 2012

(86) PCT No.: PCT/EP2012/068749
§ 371 (c)(1),
(2) Date: Apr. 2, 2014

(87) PCT Pub. No.: WO2013/050267
PCT Pub. Date: Apr. 11, 2013

(65) Prior Publication Data
US 2014/0245847 A1 Sep. 4, 2014

(30) Foreign Application Priority Data
Oct. 3, 2011 (SE) ...................................... 1150907

(51) Int. Cl.
*F16H 25/20* (2006.01)
*F16H 25/24* (2006.01)
(Continued)

(52) U.S. Cl.
CPC ............. *F16H 25/24* (2013.01); *B30B 1/18* (2013.01); *F16C 29/123* (2013.01); *F16H 25/20* (2013.01);
(Continued)

(58) Field of Classification Search
CPC .... F16H 25/24; F16H 2025/204; F16H 25/20; F16C 29/123
(Continued)

(56) References Cited

U.S. PATENT DOCUMENTS 5,357,067 A * 10/1994 Keck ....................... G05G 1/015
200/19.26
6,101,889 A * 8/2000 Laskey ............... F16H 25/2204
116/282
(Continued)

FOREIGN PATENT DOCUMENTS

DE 24 61 773 A1 7/1976
JP 11-37154 * 2/1999
JP 2001-099148 A 4/2001

OTHER PUBLICATIONS

International Search Report (ISR) dated Dec. 21, 2012 issued in International Application No. PCT/EP2012/068749.

Primary Examiner — William C Joyce
(74) Attorney, Agent, or Firm — Holtz, Holtz & Volek PC

(57) ABSTRACT

A screw actuated press unit for mounting parts with press fit includes a casing, an actuating screw rotationally journalled in the casing and coupled to a rotation motor, a nut assembly cooperating with the actuating screw, a thrust rod rigidly connected to the nut assembly and extending out of the casing for connection to a work piece, and a locking device effective to rotationally lock the nut assembly to the casing at rotation of the actuation screw, wherein the lock device includes at least three roller studs mounted on and radially extending from the nut assembly and arranged to guidingly cooperate with two parallel guide rails at the edges of an axially extending slot in the casing. The roller studs are spring biased in opposite directions in contact with the guide rails so as to eliminate rotational play between the nut assembly and the casing.

3 Claims, 2 Drawing Sheets

(51) Int. Cl.
*B30B 1/18* (2006.01)
*F16C 29/12* (2006.01)
(52) U.S. Cl.
CPC ... *F16H 2025/204* (2013.01); *Y10T 74/18648* (2015.01)
(58) Field of Classification Search
USPC .......................................................... 74/89.23
See application file for complete search history.

(56) References Cited

U.S. PATENT DOCUMENTS

2009/0044646 A1 2/2009 Duck et al.
2010/0206104 A1 8/2010 Pfister et al.

\* cited by examiner

SCREW ACTUATED PRESS UNIT

FIELD OF THE INVENTION

The invention relates to a screw actuated press unit intended for joining parts by a press fit and comprising a casing with a motor driven actuating screw, a non-rotating nut, and a thrust rod connected to the nut for performing a linear thrust force on the parts to be joined via the nut.

BACKGROUND OF THE INVENTION

A problem concerned with press units of the above type resides in the difficulty to obtain a good rotation locking function between the nut and the casing, either directly between the nut itself and the casing or via the thrust rod in rotation locking engagement with the casing. In previous press units of the above type there has been used different types of rotation locking arrangements, for instance a splines connection between the thrust rod and the casing by which longitudinal movements of the thrust rod is permitted whereas rotation is not. A drawback of this type of rotation locking arrangement is that it requires a rather long engagement distance between the casing and the thrust rod to keep down the contact pressure between the parts and to thereby provide an acceptably long service life of this splines connection. This means in turn that the length of the casing tends to be undesirably large, especially when applied on the press unit intended for use in cramped areas.

Another way of accomplishing a rotation locking means for this type of press units is to provide the nut with one or more radially extending key elements arranged to cooperate with longitudinal keyways in the casing. Known such arrangement have resulted in high manufacturing costs since they require particular shapes both of the casing and the nut. Known such arrangements have also been suffering not only from an unacceptable mechanical wear but also a less accurate guidance of the nut/thrust rod, because in many applications there are very high demands on the accuracy of the longitudinal movement of the thrust rod and hence, the rotational movement of the nut. It is difficult to obtain a play free engagement between the nut and the keyways in the casing, because sliding contact surfaces inevitably require a small but still a play between them to ensure a jam free operation and for carrying some lubricant.

SUMMARY OF THE INVENTION

It is an object of the invention to provide a screw actuated press unit wherein the rotational locking of the linearly travelling nut relative to the casing is obtained to thereby ensure a high level of accuracy of the thrust rod movement.

It is a further object of the invention to provide a screw actuated press unit wherein the length of the casing is not affected in a negative way, and wherein the service life of the rotation locking means is substantially extended.

Further objects and advantages of the invention will appear from the following specification and claims.

According to one aspect of the invention, a screw actuated press unit includes a casing, an actuating screw rotationally journalled in the casing, a rotation motor drivingly coupled to the actuation screw, a nut assembly cooperating with the actuation screw, a thrust rod rigidly connected to the nut assembly and extending out of the casing for connection to a work piece, and a locking device effective to rotationally lock the nut assembly to the casing while permitting axial movement of the nut assembly at rotation of the actuating screw. The locking device includes two or more radially extending roller studs mounted on the nut assembly in a common axially directed row, and an axially extending slot in the casing and two parallel guide rails disposed on the edges of the slot. The lock studs engage the guide rails to prevent rotation of the nut assembly during press unit operation.

A preferred embodiment of the invention will be described in detail below with reference to the accompanying drawings.

DETAILED DESCRIPTION

Figure 4:
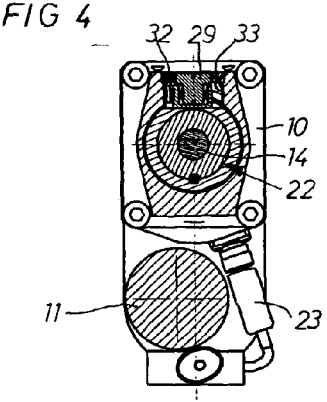
FIG. 4 shows a cross section along line B-B in FIG. 3.

The press unit illustrated in the drawings comprises a main casing 10 to which is attached an electric rotation motor 11 having a connection piece 12 for a multi core cable communication of power as well as control signals between the press unit and a separate control unit (not shown). In the casing 10 there is rotationally journalled an actuating screw 14 which is coupled to the motor 11 via a reduction gearing 15. The latter is located at the rear end wall 13 of the casing 10 and comprises a spur gear 16 rigidly attached to the screw 14. The screw 14 is supported at its rear end by three ball bearings 17, 18 and 19, which are of the angular contact type for transferring radial as well as axial forces from the screw 14 to the casing 10. The bearings 17,18, 19 are supported in a common mounting sleeve 20 which is secured to the rear end wall 13 via thin walled neck portion 21. On this neck portion 21, which is elastically deformable in response to the load applied thereon, there is mounted a strain gauge sensor (not illustrated) for delivering signals in response to the axial load applied on the bearings 17, 18, 19 and corresponding to the output thrust force delivered by the press unit. As illustrated in FIG. 4, the press unit is provided with an external connector 23 for signal wiring communicating with the strain gauge sensor on the bearing mounting sleeve 20.

The actuating screw 14 is arranged to cooperate with a nut assembly 22 for transforming the rotational movement of the screw 14 into a linear movement. To the nut assembly 22 there is rigidly connected a tubular thrust rod 24 which extends out of the casing 10 to be connected to a work piece. The thrust rod 24 is supported by a plain bushing 25 at the front end of the casing 10, and the screw 14 is radially supported on the inside wall 26 of the thrust rod 24.

The nut assembly 22 is preferably of a type having a number of planetary screw members (not shown) for cooperation with the screw 14. This type of nut design is previously known in this type of press units, and a detailed description thereof has therefore been left out. The great advantage with that type of nut assembly design is a large total contact surface between the nut assembly 22 and the screw 14, which provides for a low level of mechanical wear.

Figure 1:
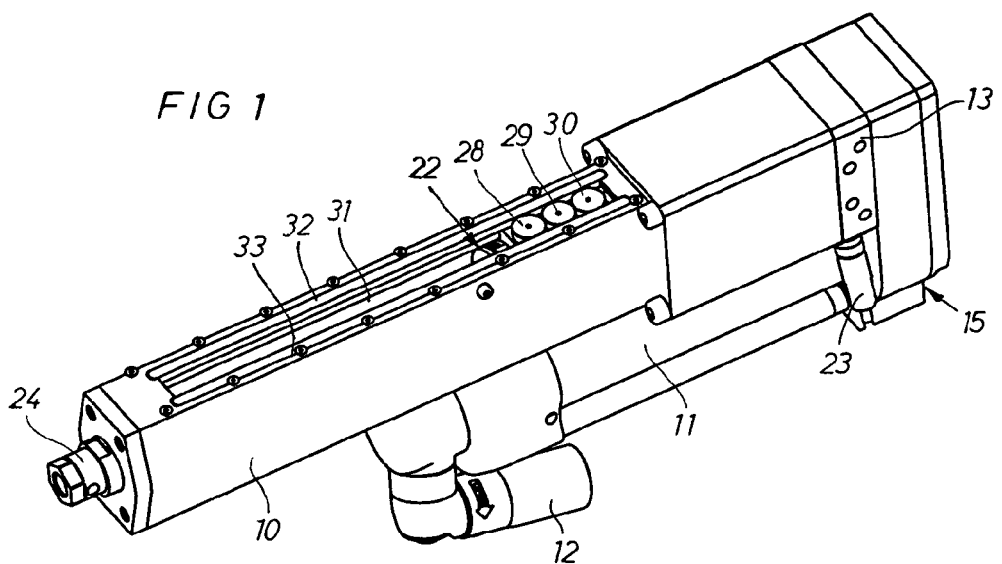
FIG. 1 shows a perspective view of a press unit according to the invention.
Figure 2:
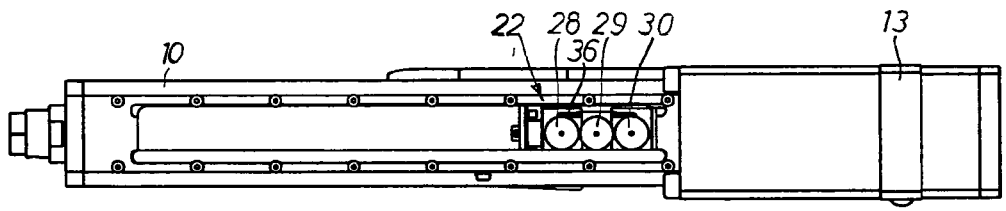
FIG. 2 shows a top view of the press unit in FIG. 1.
Figure 5:
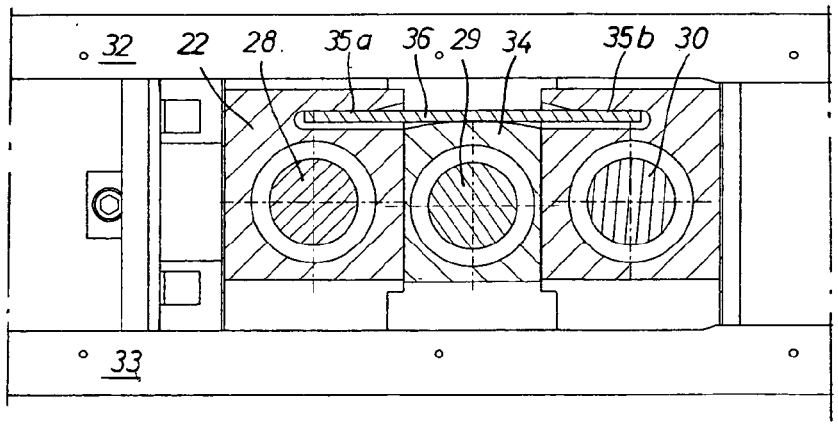
FIG. 5 shows on a larger scale and partly in section a detail view of the nut assembly and roller arrangement.
Figure 3:
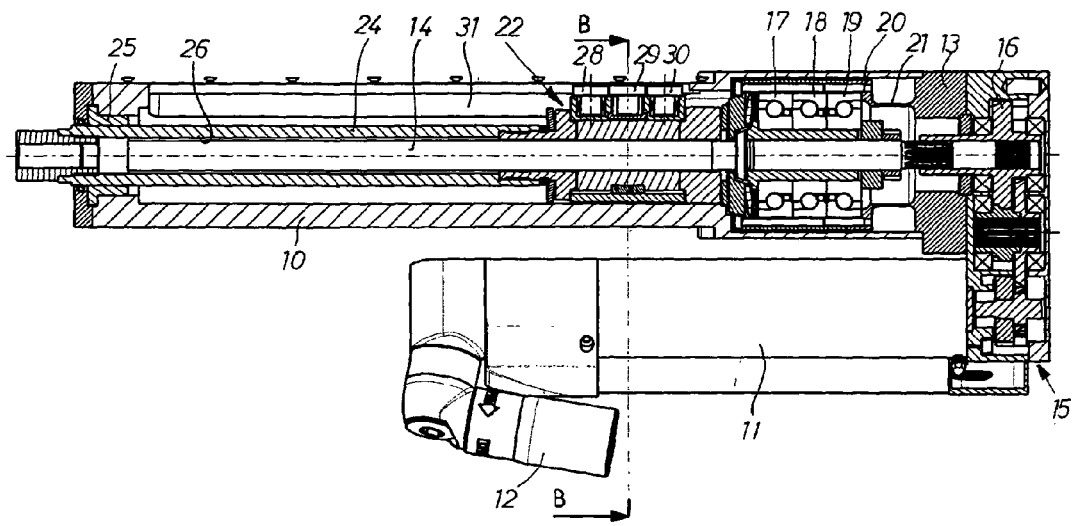
FIG. 3 shows, partly in section, a longitudinal view of the press unit in FIG. 1.

In accordance with the invention the nut assembly 22 is provided with three rotation preventing radially directed lock elements in the form of roller studs 28, 29 and 30. These roller studs are disposed in a common axially directed row and extend laterally out through an axially directed slot 31 in the casing. The roller studs 28, 29, 30 are arranged to cooperate with two parallel guide rails 32,33 mounted at the edges of the slot 31. The roller studs 28,29,30 are biased into a rolling engagement with the guide rails 32,33 by a leaf spring element 36, so as to eliminate any rotational play between the nut assembly 22 and the casing 10. The roller studs 28,29,30 comprise needle bearings for low friction rotation, and are arranged such that the roller stud 29 located in the middle of the three is biased by the spring element 36 towards one of the guide rails 33, whereas the other two roller studs 28,30 are biased as a reactive action towards the opposite guide rail 32. For accomplishing this double acting contact engagement with the guide rails 32,33 the middle roller stud 29 is supported on a bearing block 34 which is movably guided in a transverse direction relative to nut assembly 22 and the other two roller studs 28,30. The leaf spring element 36 is supported by its ends in grooves 35 *a,b* in the nut assembly 22 and is arranged to exert a bias load on the bearing block 34. See FIG. 5. This arrangement ensures that there will be no play between the nut assembly 22 and the casing 10 as long as the reaction force on the nut assembly 22 does not supersede the bias load of the spring element 36. For a higher press force output of the press unit a stronger leaf spring element 36 is to be chosen to counteract the higher reaction torque on the nut assembly 22 and to ensure a play free locking of the nut assembly 22 relative to the casing 10. It is important, though, that the spring load on the rollers 28,29,30 is not unnecessarily high, because the higher the contact pressure between the rollers 28,29,30 and the guide rails 32,33 the higher the mechanical wear of the parts involved.

In operation, the motor 11 is connected to a power source and to the control unit to make the motor 11 operate in accordance with a predetermined program, i.e. to obtain a certain press force at a desired axial stroke of the thrust rod 24. Also, the thrust rod 24 is provided with a suitable working implement for engagement with the work piece at hand. In the start position of the unit the nut assembly 22 occupies its rearmost position close to the rear end wall 13, which means that the thrust rod 24 occupies its most retracted position, as illustrated in the drawing figures. As the press unit is to be started a signal is delivered to the motor from the control unit, which results in a commenced rotational movement of the reduction gearing 15 and the actuation screw 14. The thread engagement between the actuating screw 14 and the nut assembly 22 provides for a linear movement of the nut assembly 22 and the thrust rod 24. A condition for this is that the nut assembly 22 is prevented from rotating in the casing 10. This is accomplished by inter-engagement of the rollers 28,29,30 and the guide rails 32,33 on the casing 10. At continued rotation of the actuation screw 14 the thrust rod 24 is able to perform its work task, namely to press together two parts via a press fit by applying a thrust force thereto. During its travel along the actuation screw 22 the nut assembly 22 is continuously locked against rotation via the low friction engagement between the rollers 28,29,30 and the guide rails 32,33. The spring bias of the roller studs 28,29,30 against the guide rails 32,33 ensures that there will be no rotational play between the nut assembly 22 and the casing 10.

The reaction force resulting from the thrust force applied by the thrust rod 24 is transferred to the casing 10 via the ball bearings 17,18,19, the mounting sleeve 20, and the rear end wall 13. The magnitude of reaction force and, hence, the executed thrust force is indicated by signals delivered by the strain gauge sensor on the weak neck portion 21 of the mounting sleeve 20, and these signals are compared to data programmed in the control unit. Subsequently either an OK or NOK signal is delivered to indicate to the operator whether the operation has been performed satisfactory. I particular, the very axial position in which the intended press work is completed is highly essential and determined by data stored in the control unit. An accurate position indication is obtained by a rotation/angle sensor on the motor. A linear movement/position sensor on the thrust rod 24 would not give an accurate enough indication for governing the process according to the high demands usually applied.

As the intended press work is completed the motor is stopped and reversed, which means that the actuating screw 14 starts rotating in its reverse direction, thereby making the nut assembly 22 to change movement direction causing a retracting movement on the thrust rod 24.

It is to be noted that the invention is not limited to the shown and described example but may be freely varied within the scope of the claims.

The invention claimed is:

1. A screw actuated press unit comprising:
   a casing;
   an actuating screw rotationally journalled in the casing;
   a rotation motor drivingly coupled to the actuation screw;
   a nut assembly cooperating with the actuation screw;
   a thrust rod rigidly connected to the nut assembly and extending out of the casing for connection to a work piece;
   a spring element; and
   a locking device which rotationally locks the nut assembly to the casing while permitting axial movement of the nut assembly at rotation of the actuating screw;
   wherein said locking device comprises at least three radially extending roller studs mounted on the nut assembly in a common axially directed row, an axially extending slot in the casing, and two parallel guide rails disposed on edges of said slot;
   wherein said roller studs engage said guide rails to prevent rotation of the nut assembly during press unit operation,
   wherein said middle roller stud is supported on a bearing block which is movably guided in a transverse direction relative to the nut assembly and relative to said other two of said at least three roller studs,
   wherein said spring element is a leaf spring element is arranged to exert a bias force on said roller studs against said guide rails for eliminating rotational play between the nut assembly and the casing, such that the leaf spring presses a middle one of said at least three roller studs that is located between the other two of said at least three roller studs in a first transversal direction against one of said guide rails, and such that the leaf spring presses said other two of said at least three roller studs in a second transversal direction opposite to the first transversal direction, against the opposite guide rail,
   wherein the nut assembly is cylindrical,
   wherein the casing is configured with only said two parallel guide rails for preventing rotation of the nut, and
   wherein the nut assembly is arranged freely in the casing such that rotation of the nut assembly is prevented only by the roller studs engaging the guide rails.

2. The press unit according to claim 1, wherein said leaf spring has a first end supported in a groove in the nut assembly adjacent to one of the other two of said at least three roller studs, has a second end supported in a groove in the nut assembly adjacent to another one of the other two of said at least three roller studs, and is pretensioned against said bearing block.

3. The press unit according to claim 1, wherein a bias load of the spring element is higher than a reaction force caused by a highest press force of the press unit.

\* \* \* \* \*